US008712041B2

(12) United States Patent
Lee et al.

(10) Patent No.: US 8,712,041 B2
(45) Date of Patent: Apr. 29, 2014

(54) CONTENT PROTECTION APPARATUS AND CONTENT ENCRYPTION AND DECRYPTION APPARATUS USING WHITE-BOX ENCRYPTION TABLE

(75) Inventors: Yun-Kyung Lee, Daejeon (KR); Sin Hyo Kim, Daejeon (KR); Byung Ho Chung, Daejeon (KR); Hyeran Mun, Daejeon (KR); Sang-Woo Lee, Daejeon (KR); Sokjoon Lee, Daejeon (KR); Jung Yeon Hwang, Daejeon (KR); Gun Tae Bae, Daejeon (KR); Hyun Sook Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 5 days.

(21) Appl. No.: 13/284,801

(22) Filed: Oct. 28, 2011

(65) Prior Publication Data
US 2012/0170740 A1 Jul. 5, 2012

(30) Foreign Application Priority Data

Jan. 5, 2011 (KR) .................. 10-2011-0000935

(51) Int. Cl.
*H04L 9/00* (2006.01)
(52) U.S. Cl.
USPC .................................................. 380/44
(58) Field of Classification Search
USPC .................................................. 380/44
See application file for complete search history.

(56) References Cited

U.S. PATENT DOCUMENTS

| | | | |
|---|---|---|---|
| 7,769,165 B2 | 8/2010 | Jakubowski et al. | |
| 2005/0021989 A1* | 1/2005 | Johnson et al. | 713/194 |
| 2007/0033141 A1* | 2/2007 | Higurashi | 705/50 |
| 2007/0220279 A1* | 9/2007 | Northcutt et al. | 713/193 |
| 2009/0292751 A1* | 11/2009 | Schneider | 708/250 |
| 2010/0080395 A1 | 4/2010 | Michiels et al. | |
| 2010/0268958 A1* | 10/2010 | Home et al. | 713/176 |
| 2010/0296649 A1* | 11/2010 | Katzenbeisser et al. | 380/28 |
| 2012/0099726 A1* | 4/2012 | Kim et al. | 380/44 |
| 2012/0300922 A1* | 11/2012 | Billet et al. | 380/28 |

FOREIGN PATENT DOCUMENTS

KR 1020100059961 A 6/2010

OTHER PUBLICATIONS

S. Chow et al., "White-Box Cryptography and an AES Implementation", post-proceedings of the 19th Annual Workshop on Selected Areas in Cryptography (SAC'02), Aug. 15-16, 2002.
Yun-Kyung Lee et al., "Contents Protection Method Using White Box Cryptography", Oct. 29, 2010.

* cited by examiner

*Primary Examiner* — William Powers
*Assistant Examiner* — Stephen Sanders

(57) ABSTRACT

A content protection apparatus using a white-box encryption table includes: a random number generation unit for generating a random number; a white-box encryption table for encrypting the random number and user information provided from a user to generate an encrypted output value; and an operation unit for performing an operation between the encrypted output value and data inputted from an outside to encrypt or decrypt the data.

18 Claims, 3 Drawing Sheets

CONTENT PROTECTION APPARATUS AND CONTENT ENCRYPTION AND DECRYPTION APPARATUS USING WHITE-BOX ENCRYPTION TABLE

CROSS-REFERENCE(s) TO RELATED APPLICATION(s)

The present invention claims priority of Korean Patent Application No. 10-2011-0000935, filed on Jan. 5, 2011, which is incorporated herein by reference.

FIELD OF THE INVENTION

The present invention relates to an apparatus using a white-box encryption table; and, more particularly, to a content protection apparatus and content encryption and decryption apparatus using a white-box encryption table.

BACKGROUND OF THE INVENTION

White-box cryptography is used to prevent an encryption key from being exposed to an attacker. This may be implemented by hiding an encryption key within a module implemented with an encryption algorithm such that the encryption key cannot be extracted even when the encryption module of a white-box is disclosed.

The white-box cryptography is drawing attention as a technology for content protection, but, there has been little research on a content protection method using the white-box cryptography, while research into a method for implementing a white-box having an encryption algorithm and a stability analysis thereof has increased.

A conventional white-box cryptography may be implemented by dividing a block encryption algorithm, such as an advanced encryption standard (AES) and a data encryption standard (DES), into several encryption lookup tables, in which an encryption key is hidden within the lookup tables such that an attacker cannot extract the encryption key from the white box encryption lookup tables.

However, this white-box cryptography has defects in which an encryption/decryption speed is slow and the size of an executable file is considerably large, compared to an encryption algorithm implemented by existing software.

Accordingly, in the conventional white-box cryptography, there is a limitation in transmitting the white-box encryption tables to a client terminal at all times like a content encryption key, and there is no way to prevent an attacker from bringing the entire white-box encryption tables and reproducing them.

SUMMARY OF THE INVENTION

In view of the above, the present invention provides a content protection apparatus using a white-box encryption table, which is capable of outputting an encrypted value for encrypting and decrypting contents based on a random number and user information.

Further, the present invention provides a content encryption apparatus using a white-box encryption table, which is capable of encrypting contents by using a white-box encryption table including a table part 1 generated based on user information and a table part 2 generated based on an encryption key for encrypting the contents.

Further, the present invention provides a content decryption apparatus, which is capable of decrypting contents by using a white-box encryption table including a table part 1 generated based on user information and a table part 2 corresponding to the contents.

In accordance with a first aspect of the present invention, there is provided a content protection apparatus using a white-box encryption table, the apparatus including:

a random number generation unit for generating a random number;

a white-box encryption table for encrypting the random number and user information provided from a user to generate an encrypted output value; and an operation unit for performing an operation between the encrypted output value and data inputted from an outside to encrypt or decrypt the data.

In accordance with a second aspect of the present invention, there is provided a content encryption apparatus using a white-box encryption table, the apparatus including:

a user registration unit for collecting, when a user subscribes as a member, user information of the user and storing the collected user information in a user information database;

a random number generation unit for generating a random number based on the user information stored in the user information database;

a key generation unit for generating an encryption key for each content;

a table generation unit for generating a table part 1 based on the random number and generating a table part 2 based on the encryption key to provide the white-box encryption table including the table part 1 and the table part 2; and a content encryption unit for encrypting contents requested by the user by using the white-box encryption table.

In accordance with a third aspect of the present invention, there is provided a content decryption apparatus using a white-box encryption table, the content decryption apparatus receiving contents from a server device which encrypts and transmits the contents by using the white-box encryption table including a table part 1 generated based on user information and a table part 2 generated by using a content encryption key, the content decryption apparatus including:

a first storage unit for receiving, when a user accesses the server device and subscribes as a member, the table part 1 from the server device and storing the same;

a second storage unit for receiving, when the user requests contents from the server device, the table part 2 from the server device and storing the same;

a control unit for extracting the table part 1 and the table part 2 corresponding to the requested contents from the first and second storage units, respectively; and a content decryption unit for decrypting the contents by using the table part 1 and the table part 2 extracted by the control unit.

BRIEF DESCRIPTION OF THE DRAWINGS

The above and other objects and features of the present invention will become apparent from the following description of embodiments, given in conjunction with the accompanying drawings, in which.

DETAILED DESCRIPTION OF THE EMBODIMENT

Hereinafter, embodiments of the present invention will be described in detail with reference to the accompanying drawings.

Figure 1:
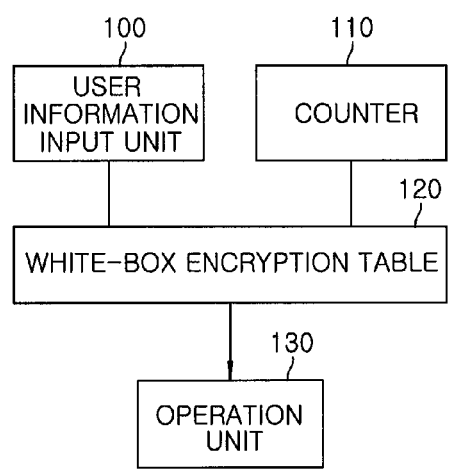
FIG. 1 illustrates a block diagram of a content protection apparatus using a white-box encryption table in accordance with an embodiment of the present invention.

FIG. 1 illustrates a block diagram of a content protection apparatus using a white-box encryption table in accordance with an embodiment of the present invention. The content protection apparatus as a content encryption/decryption apparatus may be installed on a server providing contents or on a client device receiving contents. The apparatus includes a user information input unit 100, a counter 110, a white-box encryption table 120 and an operation unit 130.

The user information input unit 100 may extract user information that is previously stored in a database (not shown) or may provide an interface for inputting user information. The user information extracted from the database or inputted through the interface is provided to the white-box encryption table 120. For example, if the content protection apparatus is installed on a server, the user information registered in a database of the server is extracted, and if the content protection apparatus is installed on a client device, the interface for inputting the user information is provided and further unique information of the client device, which is also included in the user information, may be extracted and provided. Here, the user information may include a user identification (ID), a user password, device unique information, personal information inputted by a user, and the like.

The counter 110 generates a counter value as the user information is inputted through the user information input unit 100 and provides the generated counter value to the white-box encryption table 120. The counter value may be a random number generated in a device such as a random number generator. That is, the counter 110 generates a random number whenever the user information is inputted.

The white-box encryption table 120 encrypts the counter value generated in the counter 110 and the user information received from the user information input unit 100, and provides an encrypted output value to the operation unit 130. To this end, the white-box encryption table 120 may include a table part 1 generated based on a random number and a table part 2 composed of encryption keys for encrypting the contents. Here, the table part 2 may have different values for different contents provided and the table part 1 may have values varied at a predetermined time interval.

The operation unit 130 encrypts data, e.g., contents, inputted from the outside or decrypts encrypted contents, by using the encrypted output value. That is, the encrypted output value and data may be XOR operated to perform an encryption or decryption.

Although the embodiment of the present invention describes a case in which the content protection apparatus is applied to contents requiring a copyright protection by way of example, it is obvious to those skilled in the art that the present invention is applicable to various digital information, e.g., software programs requiring prevention of illegal use.

In accordance with the embodiment of the present invention, a white-box encryption table receives user information and a random number to provide an output value for encrypting or decrypting data. Accordingly, even when the entire white-box encryption table is hacked, the use thereof is not available unless the user information is known, thereby improving the security of the white-box encryption table.

An example in which the content protection apparatus having the above-described configuration is applied to a copyright protection system will be described with reference to FIG. 2.

Figure 2:
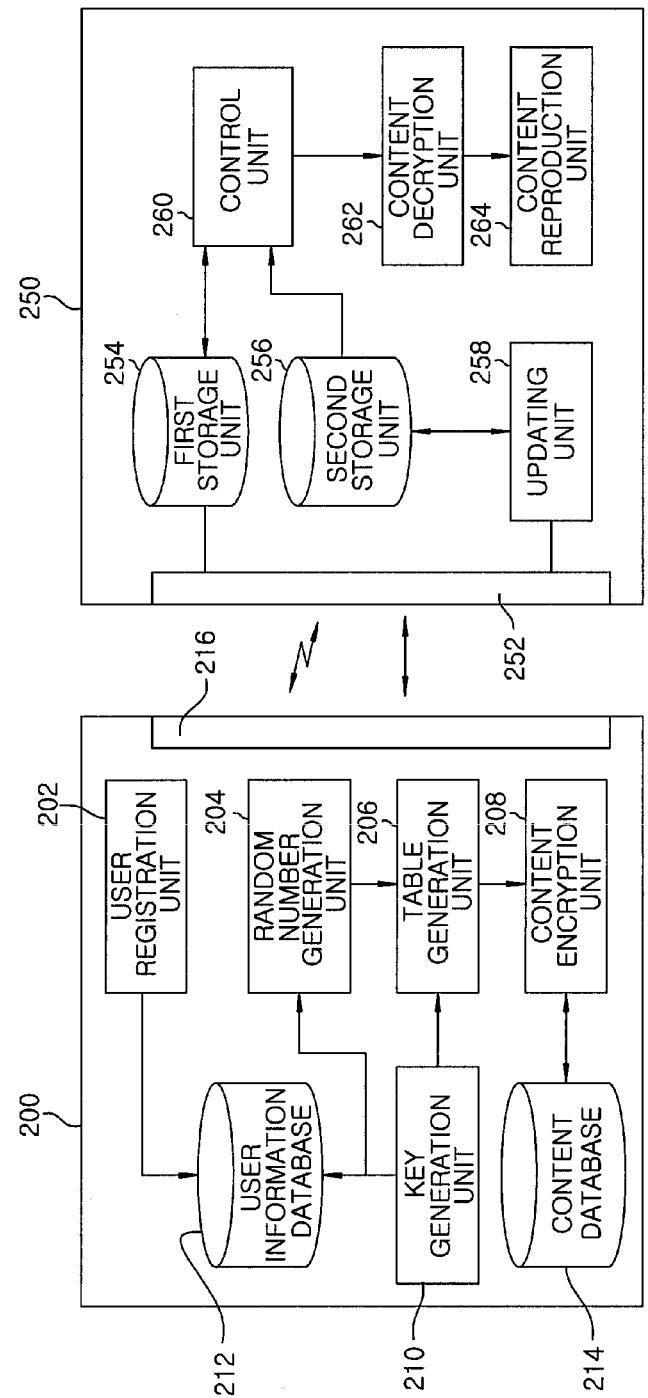
FIG. 2 shows a block diagram of a content copyright protection system using a white-box encryption table in accordance with the embodiment of the present invention.

FIG. 2 shows a block diagram of a content copyright protection system using a white-box encryption table in accordance with the embodiment of the present invention. As shown in FIG. 2, the content copyright protection system includes a server device 200 for encrypting and transmitting contents by using a white-box cryptography, and a client device 250 for receiving and decrypting the encrypted contents. The server device 200 and the client device 250 may be connected to each other through a wire/wireless communication network (not shown).

The server device 200 includes a user registration unit 202, a random number generation unit 204, a table generation unit 206, a content encryption unit 208, a key generation unit 210, a user information database 212, a content database 214 and a client interface 216.

The user registration unit 202 collects user information from the client device 250 and stores the collected information in the user information database 212.

The random number generation unit 204 generates a random number for each user, and then stores the generated random number in the user information database 212 and also provides the same to the table generation unit 206.

The key generation unit 210 generates an encryption key for encrypting contents and stores the generated encryption key together with a content ID in the user information database 212 so that they can be used later for tracing a source of the illegal leak of contents and managing encrypted contents in the server device 200, and the like.

The table generation unit 206 generates a white-box encryption table based on the random number provided from the random number generation unit 204 and the encryption key generated by the key generation unit 210. In the white-box encryption table, a table part 1 having no relation to the encryption key is first generated, and then when there is a content request, e.g., a purchase request from the client device 250 of a user, a table part 2 related to the encryption key is generated. Otherwise, the table part 1 and the table part 2 may be generated at the same time. Here, since the table part 2 is generated based on the encryption key generated by the key generation unit 210, when the key generation unit 210 generates a different encryption key for each content, the table part 2 may change depending on the content. Accordingly, the white-box encryption table may be composed of one table part 1 and multiple table parts 2.

The table part 1 in the generated white-box encryption table is provided to the client device 250, and when there is a content request, both of the table part 1 and the table part 2 are provided to the client device 250.

The content encryption unit 208 encrypts corresponding contents, e.g., contents requested by the client device 250 of the user by using the white-box encryption table. The encrypted contents are transmitted to the client device 250 through the client interface 216.

On the other hand, the content encryption unit 208 may employ the content protection apparatus shown in FIG. 1. In this case, the content encryption unit 208 receives a random number generated by the random number generation unit 204 and user information stored in the user information database 212, and generates an encrypted output value based on the white-box encryption table generated by the table generation unit 206 to encrypt the contents by using the encrypted output value.

Figure 3:
FIG. 3 presents a field structure stored in a user information database in accordance with the embodiment of the present invention.

The user information database 212 stores a field including user information, a random number, a content ID, a content encryption key and encrypted content information, as shown in FIG. 3.

According to the server device using a white-box cryptography in accordance with the embodiment of the present invention, instead of transmitting the entire white-box encryption table to the client device 250, only the table part 1 which is a portion of the white-box encryption table may be transmitted to the client device 250 and, thereafter, when there is a content request, the table part generated based on the encryption key for encrypting contents may be transmitted. Thus, even when an attacker takes the entire white-box encryption table, reuse of the white-box encryption table may be prevented.

The client device 250 is connected to the server device 200 through the wire/wireless communications network to receive contents. Examples of the client device 250 may include a smart phone, a mobile communication terminal, a personal digital assistant (PDA), a personal computer, and the like.

The client device 250 includes a server interface 252, first and second storage units 254 and 256, an updating unit 258, a control unit 260, a content decryption unit 262 and a content reproduction unit 264.

The client device 250 accesses the server device 200 via the server interface 252 and a user signs up for a membership through a membership subscription procedure provided by the server device 200. After the user subscribes as a member, the client device 250 may first download the table part 1 of the white-box encryption table from the server device 200 to store it in the first storage unit 254. Or, the client device 250 may simultaneously download the table part 1 and the table part 2 when for the first time requesting contents and receiving the contents from the server device 200. The downloaded table part 1 and table part 2 are stored in the first and second storage units 254 and 256, respectively.

The control unit 260 extracts the white-box encryption table, i.e., a pair of the table part 1 and the table part 2 from the first and second storage units 254 and 256, respectively. Herein, since a plurality of table part 2 may exist for one table part 1, the control unit extracts a pair of the table part 2 which has an encryption key corresponding to the contents received from the server device 200 and the table part 1. The extracted white-box encryption table is delivered to the content decryption unit 262.

The content decryption unit 262 decrypts the contents received from the server device 200 by using the white-box encryption table extracted by the controller 260, and then reproduces the same through the content reproduction unit 264.

Meanwhile, content decryption unit 262 may employ the content protection apparatus shown in FIG. 1. In that case, the content decryption unit 262 receives a random number generated in the counter 110 and user information received through the user information input unit 100 and generates an encrypted output value by using the white-box encryption table extracted from the first and second storage units 254 and 256. Further, the content decryption unit 262 decrypts the encrypted contents by using the encrypted output value and provide the decrypted contents to the content reproduction unit 264.

The updating unit 258 updates the white box encryption table stored in the first and second storage units 254 and 256.

Specifically, the updating unit 258 updates, when a seed value is received from the table generation unit 206 of the server device 200, the table part 1 by performing a simple operation between the table part 1 and the seed value and thereby updates the white-box encryption table. The simple operation may be matrix multiplication, XOR, substitution operation, or the like.

Alternatively, the table part 1 may be periodically transmitted to the updating unit 208 from the table generation unit 206 of the server device 200, and in that case, the updating unit 258 updates the white-box encryption table by using the table part 1 periodically transmitted.

An operation process of the content copyright protection system having the above-mentioned configuration will be described with reference to FIG. 4.

Figure 4:
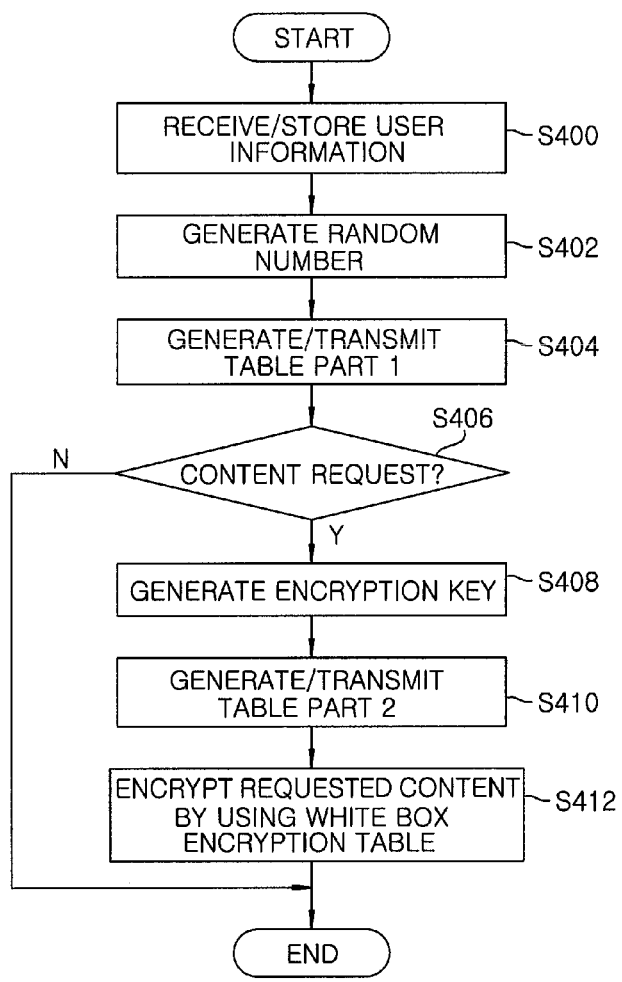
FIG. 4 is a flowchart illustrating a process of encrypting contents in a server device for a content copyright protection in accordance with the embodiment of the present invention.

FIG. 4 is a flowchart illustrating a process of encrypting contents in a server device for a content copyright protection in accordance with the embodiment of the present invention.

Referring to FIG. 4, the user registration unit 202 of the server device 200, in step S400, receives user information from the client device 250 when the client device 250 accesses the server device 200 via the server interface 252 and a user subscribes as a member through a membership subscription procedure. The user information is stored in the user information database 212. Next, the random number generation unit 204 of the server device 200 searches the user information database 212 to extract the user information, and generates a corresponding random number in step S402. The generated random number is provided to the table generation unit 206.

The table generation unit 206 generates a table part 1 of the white box encryption table by using the random number, and transmits the same to the client device 250 through the client interface 216 in step S404. The client device 250 stores the table part 1 in the first storage unit 254.

Thereafter, the server device 200 determines as to whether or not there is a content request from the client device 250 in step S406.

When there is a content request in step S406, the key generation unit 210 of the server device 200 generates an encryption key for encrypting the requested contents in step S408. The generated encryption key is provided to the table generation unit 206.

The table generation unit 206 generates a table part 2 of the white box encryption table by using the encryption key and then transmits the same to the client device 250 via the client interface 216 in step S410. Then, the client device 250 stores the table part 2 in the second storage unit 256. At this time, the white-box encryption table composed of the table part 1 and the table part 2 generated by the table generation unit 206 is provided to the content encryption unit 208.

The content encryption unit 208 searches the content database 214 for the requested contents and then encrypts the searched contents by using the white-box encryption table provided from the table generation unit 206 in step S412. The encrypted contents are transmitted to the client device 250 via the client interface 216.

The embodiment of the present invention has been described regarding a case in which the table part 1 is generated based on a random number when the user information is registered in the user information database 212. However, the table part 1 may be generated when the client device 250 requests contents. In other words, when there is a content request, a random number is generated based on the user information registered by the user registration unit 202 and the table part 1 is generated using the generated random number. As a next step, the table part 2 may be generated using an encryption key generated by the key generation unit 210.

Meanwhile, a process of decrypting contents in the client device 250 will be simply described. First, the control unit 260 of the client device 250 extracts the white-box encryption table composed of the table part 1 and the table part 2 that corresponds to contents requested by the user, from the first and second storage units 254 and 256. The extracted white-box encryption table is provided to the content decryption unit 262. Next, the content decryption unit 262 decrypts the contents by using the white-box encryption table, and then reproduces the same through the content reproduction unit 264.

In accordance with the embodiments of the present invention, it is not required to transmit an entire white-box encryption table to a client every time, but instead, updating the white-box encryption table is possible by transmitting only a portion or a specific value of the white-box encryption table to the client. Therefore, it is advantageous in that the strength of encryption can be increased and it is safe against an attack of taking the entire white-box encryption table.

In addition, a speed degradation in content decryption which may be caused by the use of white-box cryptography can be prevented. Further, since a white-box encryption table is changed depending on a user or a terminal, in the event of illegal leak of white-box encryption table, it is possible to trace a source of the leak.

While the invention has been shown and described with respect to the embodiments, it will be understood by those skilled in the art that various changes and modification may be made without departing from the scope of the invention as defined in the following claims.

What is claimed is:

1. A content protection apparatus using a white-box encryption table, the apparatus comprising:
   a random number generation unit configured to generate a random number based on an inputting of user information;
   a key generation unit configured to generate encryption keys for encrypting contents;
   a white-box encryption table configured to generate an encrypted output value based on the random number and the user information; and
   an operation unit configured to encrypt or decrypt the contents using the encrypted output value,
   wherein the white-box encryption table includes a table part 1 generated based on the random number and a table part 2 having the encryption keys for encrypting the contents, and the table part 2 is generated when there is a content request.

2. The content protection apparatus of claim 1, wherein the random number generation unit includes a counter configured to provide a counter value whenever the user information is inputted.

3. The content protection apparatus of claim 1, wherein the user information includes a user terminal information and personal information.

4. The content protection apparatus of claim 1, wherein the operation unit is configured to perform an XOR operation on the encrypted output value and the contents.

5. A content encryption apparatus using a white-box encryption table, the apparatus comprising:
   a user registration unit configured to collect, when a user subscribes as a member, user information of the user and store the user information in a user information database;
   a random number generation unit configured to generate a random number based on the user information stored in the user information database;
   a key generation unit configured to generate an encryption key for each content;
   a table generation unit configured to generate a table part 1 based on the random number and a table part 2 based on the encryption key, and provide the table part 1 and the table part 2 to a client device of the user; and
   a content encryption unit configured to encrypt contents requested by the user based on the white-box encryption table including the table part 1 and the table part 2,
   wherein the table generation unit is configured to first generate the table part 1 and provide the table part 1 to the client device of the user, and then, when there is a content request from the client device, generate the table part 2 and provide the table part 2 to the client device.

6. The content encryption apparatus of claim 5, wherein the table generation unit is configured to generate the table part 1 and the table part 2 when there is a content request from the user and provide the white-box encryption table including the table part 1 and the table part 2 to the client device of the user.

7. The content encryption apparatus of claim 5, wherein the table generation unit is configured to transmit a seed value to the client device of the user at every predetermined period such that the table part 1 provided to the client device is updated.

8. The content encryption apparatus of claim 5, wherein the table generation unit is configured to transmit the table part 1 to the client device of the user at every predetermined period such that the white-box encryption table provided to the client device is updated.

9. The content encryption apparatus of claim 5, wherein the content encryption unit is configured to encrypt the random number and the user information based on the white-box encryption table to generate an encrypted output value, and perform an encryption operation using the encrypted output value and the contents requested by the user to generate encrypted contents.

10. The content encryption apparatus of claim 9, wherein the content encryption unit is configured to perform an XOR operation using the encrypted output value and the contents requested by the user to encrypt the contents.

11. The content encryption apparatus of claim 5, wherein the content encryption unit is configured to receive the user information stored in the user information database and the random number, generate an encrypted output value using the white-box encryption table, and encrypt the contents using the encrypted output value.

12. A content decryption apparatus for decrypting encrypted contents using a white-box encryption table that includes a table part 1 and a table part 2, the content decryption apparatus comprising:
   a first storage unit configured to receive the table part 1 from a server device when a user accesses the server device and subscribes as a member, and store the same;
   a second storage unit configured to receive the table part 2 from the server device when the user requests contents from the server device, and store the same;
   a control unit configured to extract the table part 1 and the table part 2, which correspond to the requested contents, from the first and second storage units, respectively; and
   a content decryption unit configured to decrypt encrypted contents corresponding to the requested contents based on the table part 1 and the table part 2 extracted by the control unit, wherein the table part 1 includes a random number generated based on user information, and the table part 2 is generated using a content encryption key.

13. The content decryption apparatus of claim 12, further comprising:
    an updating unit configured to update the first storage unit based on information received from the server device.

14. The content decryption apparatus of claim 13, wherein the updating unit is configured to update, when the information received from the server device is the table part 1, the first storage unit using the table part 1.

15. The content decryption apparatus of claim 12, wherein the content decryption unit includes:
    a user information input unit configured to provide the user information;
    a random number generation unit configured to generate a different random number whenever the user information is inputted; and
    an operation unit configured to encrypt the user information and the random number generated by the random number generation unit using the white-box encryption table extracted by the control unit to generate an encrypted output value, and perform a decryption operation on the encrypted contents using the encrypted output value.

16. The content decryption apparatus of claim 15, wherein the operation unit is configured to perform an XOR operation using the encrypted output value and the encrypted contents.

17. The content decryption apparatus of claim 13, wherein the updating unit is configured to update, when the information received from the server device is a seed value, the first storage unit by performing an operation using the table part 1 and the seed value.

18. The content decryption apparatus of claim 17, wherein the operation is one of matrix multiplication, XOR, and a substitution operation.

* * * * *